United States Patent Office 2,724,471
Patented Nov. 22, 1955

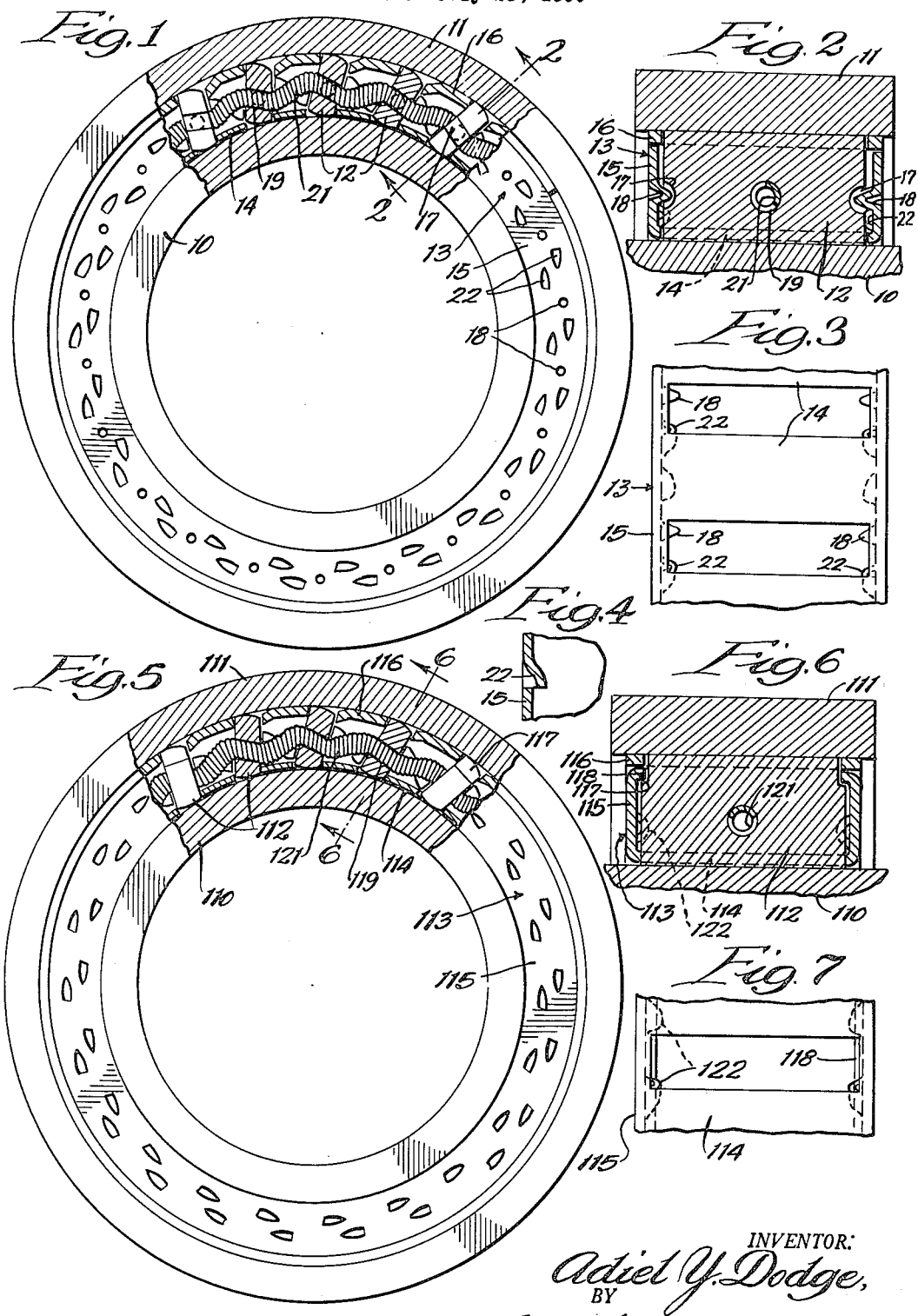

2,724,471

ONE WAY CLUTCH

Adiel Y. Dodge, Rockford, Ill., assignor to Borg-Warner Corporation, Chicago, Ill., a corporation of Illinois Application July 28, 1950, Serial No. 176,361

8 Claims. (Cl. 192—45.1)

This invention relates to one way clutches and more particularly to tiltable gripper type clutches.

It is desirable in tiltable gripper clutches to provide a cage to hold the grippers properly spaced and to assist in controlling the action thereof. It is also desirable to provide a cage which will hold the grippers assembled therein so that the cage and grippers can be handled as a unit in manufacture and assembly. Preferably the cage is constructed to limit tilting of the grippers in the disengaging direction to prevent damage to a tilting spring used with the grippers and to maintain the grippers in proper position for operation.

Heretofore cages as employed in clutches of this type have been relatively complicated and expensive to manufacture and in some cases have required specially formed grippers which may also be expensive.

It is one of the objects of the present invention to provide a one way clutch in which a single and inexpensive cage holds the grippers properly in place and may assist in controlling the action of the grippers. According to one feature the cage may be fabricated entirely of sheet metal and may be in one piece so that an extremely simple construction is provided.

Another object is to provide a one way clutch in which the cage is formed with very simple inexpensive stop members to limit tilting of the grippers in the disengaging direction.

Another object is to provide a one way clutch in which the grippers can be formed inexpensively so that they will be held assembled in the cage.

The above and other objects and features of the invention will be more readily apparent from the following description when read in connection with the accompanying drawing, in which:

Figure 1 is a side elevation with parts in section of a one way clutch embodying the invention;

Figure 2 is a section on the line 2—2 of Figure 1;

Figure 3 is a partial view of the cage looking from the inside;

Figure 4 is a partial tangential section through one of the cage flanges;

Figure 5 is a view similar to Figure 1 of an alternative construction;

Figure 6 is a section on the line 6—6 of Figure 5; and

Figure 7 is a partial view of the cage looking from the inside.

As shown in Figures 1 to 4 the clutch comprises inner and outer coaxial races 10 and 11 having spaced facing cylindrical surfaces. A series of tiltable grippers 12 are mounted between the races and have their ends curved about spaced centers so that the races can turn relatively in one direction but will be gripped against relative movement in the opposite direction.

The grippers are mounted in a cage 13 formed of sheet metal and channel shaped in section. The cage has a web 14 formed with openings through which the grippers extend and side flanges 15 overlying the ends of the grippers. Preferably the web lies adjacent the inner race 10 and the flanges extend toward but terminate short of the outer race. An auxiliary annular strip or ring 16 may lie loosely between the flanges 15 and the outer race and is formed with openings through which the grippers extend. The cross bars in the strip 16 preferably have lips bent inward at one side thereof to engage the grippers and prevent the cross bars from moving between the grippers and the outer race. When the strip 16 is employed it preferably has frictional engagement with the outer race 11 to assist in tilting the grippers during reversals in the direction of relative rotation and to hold the grippers out of engagement with the outer race during overrunning. The ring 16 cooperates with the cage 13 to control the grippers in the manner more particularly described and claimed in my Patent No. 2,404,221. The ring 16 may be omitted for most applications but is preferably used when a more positive control of the grippers is desired as when the clutch is subjected to considerable vibration.

According to the present invention the grippers are held in the cage so that the cage and gripper assembly can be handled as a unit. For this purpose the grippers are formed in their ends with transverse grooves or recesses 17 and the flanges 15 are formed with integral punched in projections 18 to fit loosely into the recesses. This construction limits radial movement of the grippers to hold them in place in the cage without interfering in any way with tilting of the grippers. The cage as so constructed can easily be fabricated from sheet metal and can be assembled with the grippers by folding the flanges against the gripper ends after the projections 18 are formed or by forming the projections 18 after the flanges are formed to their desired final shape.

The grippers can also easily be formed with the grooves 17 by piercing or drilling a continuous strip of the desired cross section and cutting the strip at the centers of the holes so formed to leave the recesses in the ends of the grippers. At the same time additional holes 19 may be formed in the grippers to receive an annular coil spring 21 as more fully described and claimed in the patent to Swenson No. 2,386,013.

According to another feature of the invention, tilting of the grippers in the disengaging direction is limited to protect the spring 21 against undue bending when the lubricant in the clutch is heavy or congealed and to maintain the grippers in proper working position. As shown, stops are provided by slitting the cage flanges along lines parallel to the gripper faces when in their released position and the metal is pressed in at one side of the slits to form stop projections 22. The projections 22 are radially spaced and are positioned to engage the opposite faces of the grippers at points spaced along their widths as shown in Figure 1. These projections thus positively limit tilting of the grippers toward their disengaging position so that the spring 21 will not be bent unduly and the grippers will be maintained in a position ready for engagement promptly upon a reversal in torque. The stops do not interfere with tilting of the grippers to their engaging position and will permit ample tilting toward disengaging position.

Figures 5 to 7 show an alternative construction, parts therein corresponding to like parts in Figures 1 to 4 being designated by the same reference numerals plus 100. In this construction the grippers are cut away at their corners adjacent the outer race to provide recesses 117. The free edges of the cage flanges 115 are turned inward at 118 to enter the recesses 117 and hold the grippers against radial movement. The recesses 117 do not affect the clutch capacity since the outer race has excess capacity over the inner race due to its greater radius, and greater area of contact due to complementary curvature.

The cage flanges 115 are formed with stop projections 122 corresponding to the projections 22 of Figures 1 to 4 and functioning in the same manner to limit tilting of the grippers.

An annular strip like the strip 16 of Figures 1 to 4 may also be employed with the construction of Figures 5 to 7, it being understood that this strip may be used or omitted as desired.

This application is a continuation-in-part of my prior copending application Serial No. 155,710, filed April 13, 1950, now abandoned.

While two embodiments of the invention have been shown and described in detail, it will be understood that these are illustrative only and are not to be taken as a definition of the scope of the invention, reference being had for this purpose to the appended claims.

What is claimed is:

1. A one way clutch comprising a series of tiltable grippers adapted to fit between concentric races, the grippers having recesses in their ends, an annular sheet metal cage channel shaped in section with openings in its web through which the grippers extend and with its flanges overlying the ends of the grippers, the cage flanges being turned inward at their free edges to fit into the recesses.

2. A one way clutch comprising concentric cylindrical races, a series of tiltable grippers between the races, the corners of the grippers being cut away adjacent the outer race to provide recesses, an annular cage channel shaped in section fitting between the races with openings in its web through which the grippers extend and with its flanges overlying the ends of the grippers, the cage web lying adjacent to the inner race and the flanges extending toward the outer race, the edges of the flanges being turned inward to fit into the recesses.

3. A one way clutch comprising a series of tiltable grippers adapted to fit between concentric races, an annular cage channel shaped in section with openings in its web through which the grippers extend and with its flanges overlying the ends of the grippers, and integral projections pressed inwardly from the cage flanges and engageable with the opposite faces of the grippers at points spaced along the gripper widths to limit tilting of the grippers in one direction.

4. A one way clutch comprising a series of tiltable grippers adapted to fit between concentric races, an annular cage channel shaped in section with openings in its web through which the grippers extend and with its flanges overlying the ends of the grippers, the grippers having spring receiving openings therethrough, an annular spring threaded through the openings and urging the grippers to tilt in a direction to engage the races, and integral projections pressed inwardly from the cage flanges to engage the opposite faces of the grippers at points spaced along the gripper widths to limit tilting of the grippers in a direction to disengage the races.

5. A one way clutch comprising a series of tiltable grippers adapted to fit between concentric races; an annular cage channel shaped in section with openings in its web through which the grippers extend and with its flanges overlying the ends of the grippers, the grippers having recesses in their ends, integral projections extending inward from the cage flanges into the recesses to limit radial movement of the grippers in the cage, and additional integral projections extending inward from the cage flanges and engageable with the opposite faces of the grippers at points spaced along the gripper widths to limit tilting of the grippers.

6. A one way clutch comprising a series of tiltable grippers adapted to fit between concentric races, an annular sheet metal cage channel shaped in cross section with openings in its web through which the grippers extend and with its flanges overlying the ends of the grippers, the grippers being formed with recesses in their ends, projections pressed inward from the cage flanges into the recesses to limit radial movement of the grippers, the grippers having spring receiving openings therethrough, an annular coil spring threaded through the openings and tending to tilt the grippers in a direction to engage the races, the flanges being formed with slits parallel to the faces of the grippers when they are tilted to a position to disengage the races, and the material of the flanges being pressed inward at one side of the slits to form projections engageable with the faces of the grippers to limit tilting of the grippers toward their disengaging position.

7. A one way clutch comprising a series of tiltable grippers adapted to fit between concentric races, an annular cage channel shaped in section with openings in its web through which the grippers extend and with its flanges overlying the ends of the grippers, an annular spring mounted in the cage and resiliently engaging the grippers and urging them to tilt in a direction to engage the races, and integral projections pressed inward from the cage flanges to engage the opposite faces of the grippers at points spaced along the gripper widths to limit tilting of the grippers in a direction to disengage the races.

8. A one way clutch comprising a series of tiltable grippers adapted to fit between concentric races, an annular cage channel shaped in section with openings in its web through which the grippers extend and with its flanges overlying the ends of the grippers, an annular spring mounted in the cage and resiliently engaging the grippers and urging them to tilt in a direction to engage the races, integral projections pressed inward from the cage flanges to engage the opposite faces of the grippers at points spaced along the gripper widths to limit tilting of the grippers in a direction to disengage the races, the web of the cage lying adjacent to one of the races and the cage flanges terminating short of the other race, and an annular auxiliary cage strip lying between the edges of the flanges and the other race and engaging the other race to be centered thereby, the auxiliary strip being formed with a series of openings therein through which the ends of the grippers extend.

References Cited in the file of this patent

UNITED STATES PATENTS

| | | |
|---|---|---|
| 2,360,481 | Dodge | Oct. 17, 1944 |
| 2,366,843 | Dodge | Jan. 9, 1945 |
| 2,383,595 | Dodge | Aug. 28, 1945 |
| 2,386,013 | Swenson | Oct. 2, 1945 |
| 2,389,961 | Dodge | Nov. 27, 1945 |